(12) United States Patent
Hashimoto et al.

(10) Patent No.: US 10,338,561 B2
(45) Date of Patent: Jul. 2, 2019

(54) DATA GENERATING DEVICE THAT GENERATES DRAWING DATA REPRESENTING INDEX PATTERN TO BE DRAWN ON WORKPIECE BY LASER BEAM FOR MEASURING DEFORMATION OF WORKPIECE

(71) Applicant: BROTHER KOGYO KABUSHIKI KAISHA, Nagoya, Aichi (JP)

(72) Inventors: Narihiko Hashimoto, Nagoya (JP); Koki Furukawa, Nagoya (JP); Ryuhei Ito, Yokkaichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 303 days.

(21) Appl. No.: 15/474,767

(22) Filed: Mar. 30, 2017

(65) Prior Publication Data
US 2017/0205799 A1    Jul. 20, 2017

Related U.S. Application Data

(63) Continuation of application No. PCT/JP2015/082683, filed on Nov. 20, 2015.

(30) Foreign Application Priority Data

Nov. 21, 2014   (JP) .................................. 2014-237005

(51) Int. Cl.
  *G05B 19/31*   (2006.01)
  *B23K 26/062*   (2014.01)
  (Continued)

(52) U.S. Cl.
  CPC ............ *G05B 19/31* (2013.01); *B23K 26/062* (2015.10); *B23K 26/082* (2015.10);
  (Continued)

(58) Field of Classification Search
  CPC .... G05B 19/31; B23K 26/062; B23K 26/362; B23K 26/082
  See application file for complete search history.

(56) References Cited

U.S. PATENT DOCUMENTS

| 5,642,293 A | 6/1997 | Manthey et al. |
| 6,615,099 B1 * | 9/2003 | Muller ................... B23K 26/04 |
| | | 219/121.68 |

(Continued)

FOREIGN PATENT DOCUMENTS

| JP | H01-148402 A | 6/1989 |
| JP | 2001-280923 A | 10/2001 |

(Continued)

OTHER PUBLICATIONS

English translation of International Preliminary Report on Patentability issued in the corresponding international patent application No. PCT/JP2015/082683 dated Jun. 1, 2017.

(Continued)

*Primary Examiner* — Vincent H Tran
(74) *Attorney, Agent, or Firm* — K&L Gates LLP

(57) ABSTRACT

A data generating device includes a memory; and a controller. The memory is configured to store a plurality of sets of drawing information about an index pattern and a laser beam used for drawing the index pattern on a surface of a workpiece in association with respective ones of a plurality of sets of machining contents individually. The index pattern is represented by drawing data. Each of the plurality of machining contents indicates a machining process to be performed on the workpiece to measure deformation of the workpiece. The controller is configured to perform: receiving a generation instruction instructing to start generating the drawing data; designating one set of machining contents from the plurality of sets of machining contents; and generating the drawing data according to designated one set of (Continued)

machining contents and corresponding one of the plurality of sets of drawing information.

14 Claims, 9 Drawing Sheets

(51) Int. Cl.
*B23K 26/082* (2014.01)
*B23K 26/362* (2014.01)
*B23K 26/352* (2014.01)
*G01B 21/32* (2006.01)

(52) U.S. Cl.
CPC .......... *B23K 26/355* (2018.08); *B23K 26/362* (2013.01); *G01B 21/32* (2013.01); *G05B 2219/33198* (2013.01)

(56) References Cited

U.S. PATENT DOCUMENTS

| | | | |
|---|---|---|---|
| 8,965,055 B2* | 2/2015 | Berthe | B23K 26/032 382/106 |
| 2007/0277619 A1 | 12/2007 | Grishaber et al. | |
| 2010/0183899 A1 | 7/2010 | Asano et al. | |
| 2010/0238462 A1* | 9/2010 | Reitz | G06F 11/2294 358/1.9 |
| 2014/0111810 A1* | 4/2014 | Shen | G01B 9/0203 356/511 |
| 2015/0143861 A1* | 5/2015 | Sato | B21D 22/208 72/17.3 |

FOREIGN PATENT DOCUMENTS

| | | |
|---|---|---|
| JP | 2006-337360 A | 12/2006 |
| JP | 2009-019267 A | 1/2009 |
| JP | 2011-43452 A | 3/2011 |
| JP | 2013-240834 A | 12/2013 |

OTHER PUBLICATIONS

International Search Report issued in the corresponding international patent application No. PCT/JP2015/082683 dated Feb. 9, 2016.

Written Opinion of International Search Authority issued in the corresponding international patent application No. PCT/JP2015/082683 dated Feb. 9, 2016.

* cited by examiner

FIG. 7

| TYPE OF MACHINING PROCESS | NUMBER OF PROCESSES | DEFORMATION DEGREE | PATTERN TYPE | RECOMMENDED HEAT INPUT | RECOMMENDED PATTERN SIZE |
|---|---|---|---|---|---|
| DRAWING | 1~3 | SMALL | PATTERN (1) | LOW | LARGE |
| DRAWING | 4~5 | SMALL | PATTERN (1) | MEDIUM | MEDIUM |
| DRAWING | 6~7 | SMALL | PATTERN (1) | HIGH | SMALL |
| COMPRESSING | 1~3 | SMALL | PATTERN (2) | LOW | SMALL |
| COMPRESSING | 4~5 | SMALL | PATTERN (2) | MEDIUM | MEDIUM |
| COMPRESSING | 6~7 | SMALL | PATTERN (2) | HIGH | LARGE |
| STRETCHING | 1~3 | SMALL | PATTERN (3) | LOW | LARGE |
| STRETCHING | 4~5 | SMALL | PATTERN (3) | MEDIUM | MEDIUM |
| STRETCHING | 6~7 | SMALL | PATTERN (3) | HIGH | SMALL |
| DRAWING | 1 | LARGE | PATTERN (4) | LOW | LARGE |
| DRAWING | 2~3 | LARGE | PATTERN (4) | MEDIUM | MEDIUM |
| DRAWING | 4~7 | LARGE | PATTERN (4) | HIGH | SMALL |
| COMPRESSING | 1 | LARGE | PATTERN (5) | LOW | SMALL |
| COMPRESSING | 2~3 | LARGE | PATTERN (5) | MEDIUM | MEDIUM |
| COMPRESSING | 4~7 | LARGE | PATTERN (5) | HIGH | LARGE |
| STRETCHING | 1 | LARGE | PATTERN (6) | LOW | LARGE |
| STRETCHING | 2~3 | LARGE | PATTERN (6) | MEDIUM | MEDIUM |
| STRETCHING | 4~7 | LARGE | PATTERN (6) | HIGH | SMALL |
| ... | ... | ... | ... | ... | ... |

FIG. 10

| THICKNESS (mm) | MAXIMUM HEAT INPUT |
|---|---|
| ~ 0.3 | LOW |
| ~ 1.0 | MEDIUM |
| 1.0 ~ | HIGH |

FIG. 11

| MATERIAL | THERMAL CONDUCTIVITY (W/m/K) | SCALE FACTOR FOR HEAT INPUT |
|---|---|---|
| ALUMINUM | 200 | × 0.4 |
| IRON | 50 | × 1.0 |
| BRASS | 100 | × 0.7 |
| ⋮ | ⋮ | ⋮ |

DATA GENERATING DEVICE THAT GENERATES DRAWING DATA REPRESENTING INDEX PATTERN TO BE DRAWN ON WORKPIECE BY LASER BEAM FOR MEASURING DEFORMATION OF WORKPIECE

CROSS REFERENCE TO RELATED APPLICATION

This application is a continuation application of International Application No. PCT/JP2015/082683 filed on Nov. 20, 2015 in the Japan Patent Office acting as Receiving Office, claiming priority from Japanese Patent Application No. 2014-237005 filed on Nov. 21, 2014. The entire contents of each of these applications are incorporated herein by reference.

TECHNICAL FIELD

The present disclosure relates to a data generating device that generates drawing data representing an index pattern to be drawn on a surface of a workpiece by a laser beam emitted from a laser machining device for measuring deformation of the workpiece.

BACKGROUND

Conventionally, a scribed circle test is well-known in a real forming or a model forming by plastic working of steel as a method for examining a deformation state and a deformation path and for measuring rupture limit strain and wrinkle limit strain of material.

In the scribed circle test, a pattern (circle or grid-like pattern, for example) configured by arranging a plurality of unit graphics is drawn as an index pattern on a surface of a test piece as a workpiece in advance. The examination of the deformation of the test piece and the measurement of the strain of the test piece are performed by measuring a form change of each unit graphic before and after the forming of the test piece.

Japanese Patent Application Publication No. 2001-280934 discloses an invention related to the drawing of an index pattern on a surface of a test piece. The invention described above is configured to draw the index pattern, in which a plurality of circles is arranged, on an outer surface of a metallic pipe by a laser marking device. Since the invention described above is configured to draw the index pattern on the outer surface of the metallic pipe by emitting a laser beam from the laser marking device, a sharp index pattern which is indelible during the machining of the test piece can be drawn unlike in the case of drawing the index pattern with a stamp and ink.

SUMMARY

The invention described above is configured to adjust the laser beam emitted from the laser marking device so that a machining depth engraved by the laser beam on the outer surface of the metallic pipe and a line width of the index pattern drawn by the laser beam are changed.

However, the test piece used in the scribed circle test is not limited to the metallic pipe used in the invention described above, but various aspects for contents of the machining performed on the test piece as well as a shape and material of the test piece are supposed. Thus, when the laser marking device described above is used, a user should search contents of the index pattern suitable for various conditions such as the shape of the test piece, the machining contents, and the like, and set them in the laser marking device. That is, when the invention described above is used as it is, highly troublesome operations are imposed on the user and thus the convenience is reduced.

In view of the foregoing, it is an object of the disclosure to provide a data generating device that generates drawing data representing an index pattern drawn by a laser beam emitted from a laser machining device for measuring deformation of a workpiece, and that can enhance the convenience of generating the drawing data.

In order to attain the above and other objects, the present disclosure provides a data generating device for generating drawing data representing an index pattern to be drawn on a surface of a workpiece by a laser beam emitted from a laser machining device. The index pattern is constituted with a plurality of unit graphics. A deformation test is performed to measure deformation of the workpiece. The data generating device includes a memory; and a controller. The memory is configured to store a plurality of sets of drawing information about the index pattern and the laser beam used for drawing the index pattern in association with respective ones of a plurality of sets of machining contents individually. Each of the plurality of machining contents indicates a machining process to be performed on the workpiece in the deformation test. The controller is configured to perform: receiving a generation instruction instructing to start generating the drawing data; designating one set of machining contents from the plurality of sets of machining contents; and generating the drawing data according to designated one set of machining contents and corresponding one of the plurality of sets of drawing information.

BRIEF DESCRIPTION OF THE DRAWINGS

The particular features and advantages of the disclosure as well as other objects will become apparent from the following description taken in connection with the accompanying drawings, in which:

FIG. 7 is an explanatory diagram illustrating an example of contents in a database;

FIG. 10 is an explanatory diagram illustrating an example of a thickness calibration table; and FIG. 11 is an explanatory diagram illustrating an example of a material calibration table.

DETAILED DESCRIPTION

Figure 1:
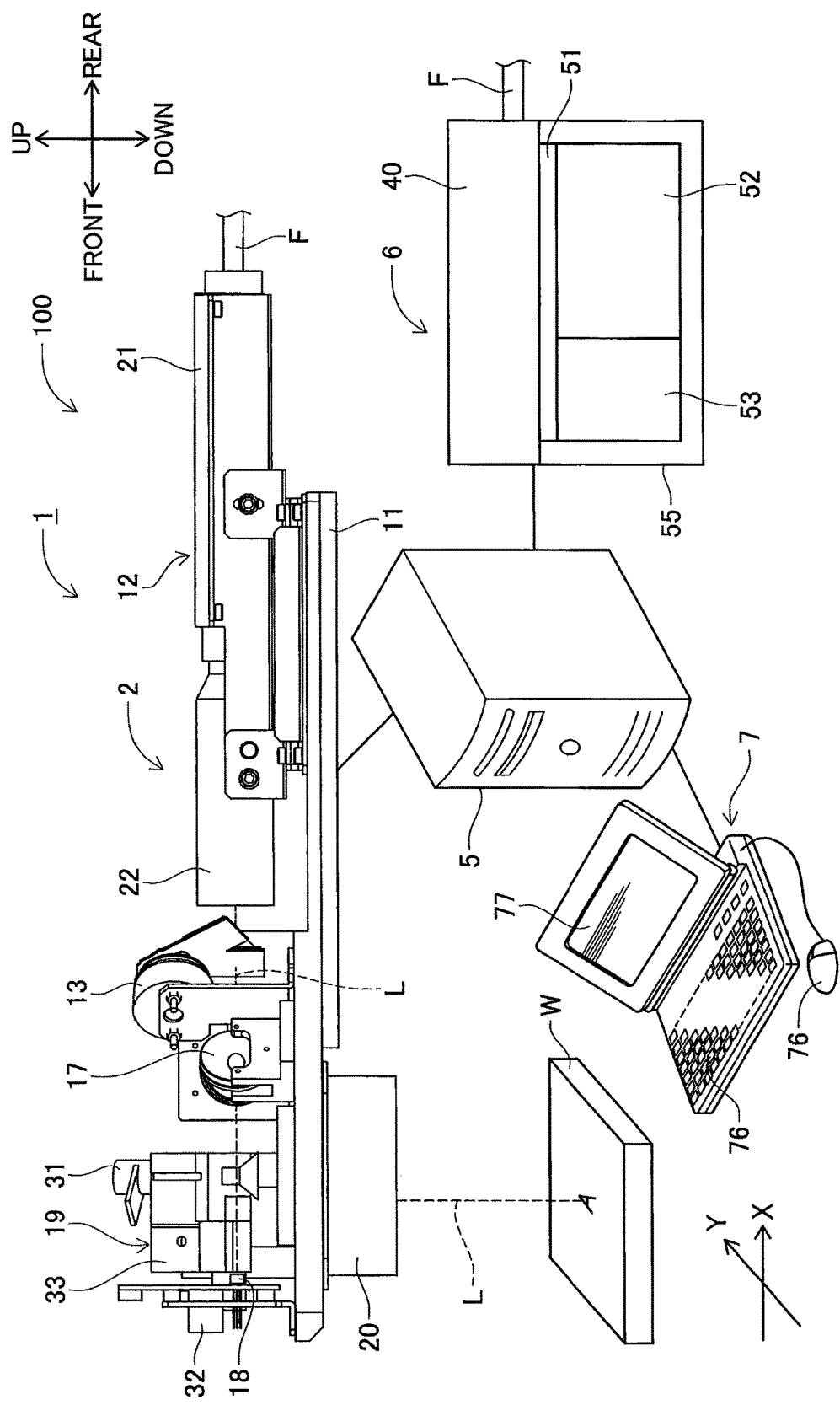
FIG. 1 is a schematic view of a laser machining system according to one embodiment of the present disclosure.

An embodiment in which a data generating device according to the present disclosure is embodied as a data generating device 7 constituting a laser machining system 100 along with a laser machining device 1 will be described while referring to the accompanying drawings wherein like parts and components are designated by the same reference numerals to avoid duplicating description.

Schematic Configuration of Laser Machining System 100

Firstly, the schematic configuration of the laser machining system 100 according to the present embodiment will be explained in detail with reference to FIG. 1. The laser machining system 100 includes the laser machining device 1 as an example of the laser machining device of the present disclosure and the data generating device 7 as an example of the data generating device of the present disclosure. The laser machining system 100 is configured to control the laser machining device 1 according to drawing data generated by the data generating device 7, thereby performing marking machining in which a laser beam L scans a surface of a workpiece (test piece W, for example) two-dimensionally.

Schematic Configuration of Laser Machining Device 1

Next, the schematic configuration of the laser machining device 1 of the laser machining system 100 will be described in detail with reference to the drawings. As illustrated in FIG. 1, the laser machining device 1 according to the present embodiment includes a device main unit 2, a laser controller 5, and a power unit 6.

The device main unit 2 irradiates the laser beam L onto the surface of the test piece W and performs two-dimensional scan of the laser beam L on the surface of the test piece W, thereby executing the marking machining on the surface of the test piece W. The test piece W is an example of the workpiece of the present disclosure. The laser controller 5 is configured of a computer, and is connected to the data generating device 7 so as to be capable of performing bi-directional communications therebetween. The laser controller 6 is also electrically connected to the device main unit 2 and the power unit 6. The data generating device 7 is configured of a personal computer, and is used for creating the drawing data and the like. The laser controller 5 drives and controls the device main unit 2 and the power unit 6 according to the drawing data, control parameters, and various instructions transmitted from the data generating device 7.

Note that FIG. 1 illustrates only the schematic configuration of the laser machining system 100 and the laser machining device 1, thus the device main unit 2 is also schematically illustrated in FIG. 1. Therefore, the specific configuration of the device main unit 2 will be described later.

Schematic Configuration of Device Main Unit 2

Next, the schematic configuration of the device main unit 2 will be described with reference to FIGS. 1 and 2. In the description about the device main unit 2, the leftward, rightward, upward, and downward in FIG. 1 respectively correspond to frontward, rearward, upward, and downward of the device main unit 2 as indicated in FIG. 1. Thus, the emitting direction of the laser beam L from a laser oscillator 21 (described later) is the frontward direction. Also, in the direction perpendicular to both a main base 11 (described later) and the laser beam L is the upward/downward directions. Further, the direction perpendicular to both the upward/downward directions and frontward/rearward directions is the leftward/rightward directions of the device main unit 2.

The device main unit 2 includes a laser head unit 3 (see FIG. 2) coaxially emitting the laser beam L and a visible laser beam M from an fθ lens 20, and a substantially box-shaped machining chamber (not shown) having an upper surface on which the laser head unit 3 is fixed.

Figure 2:
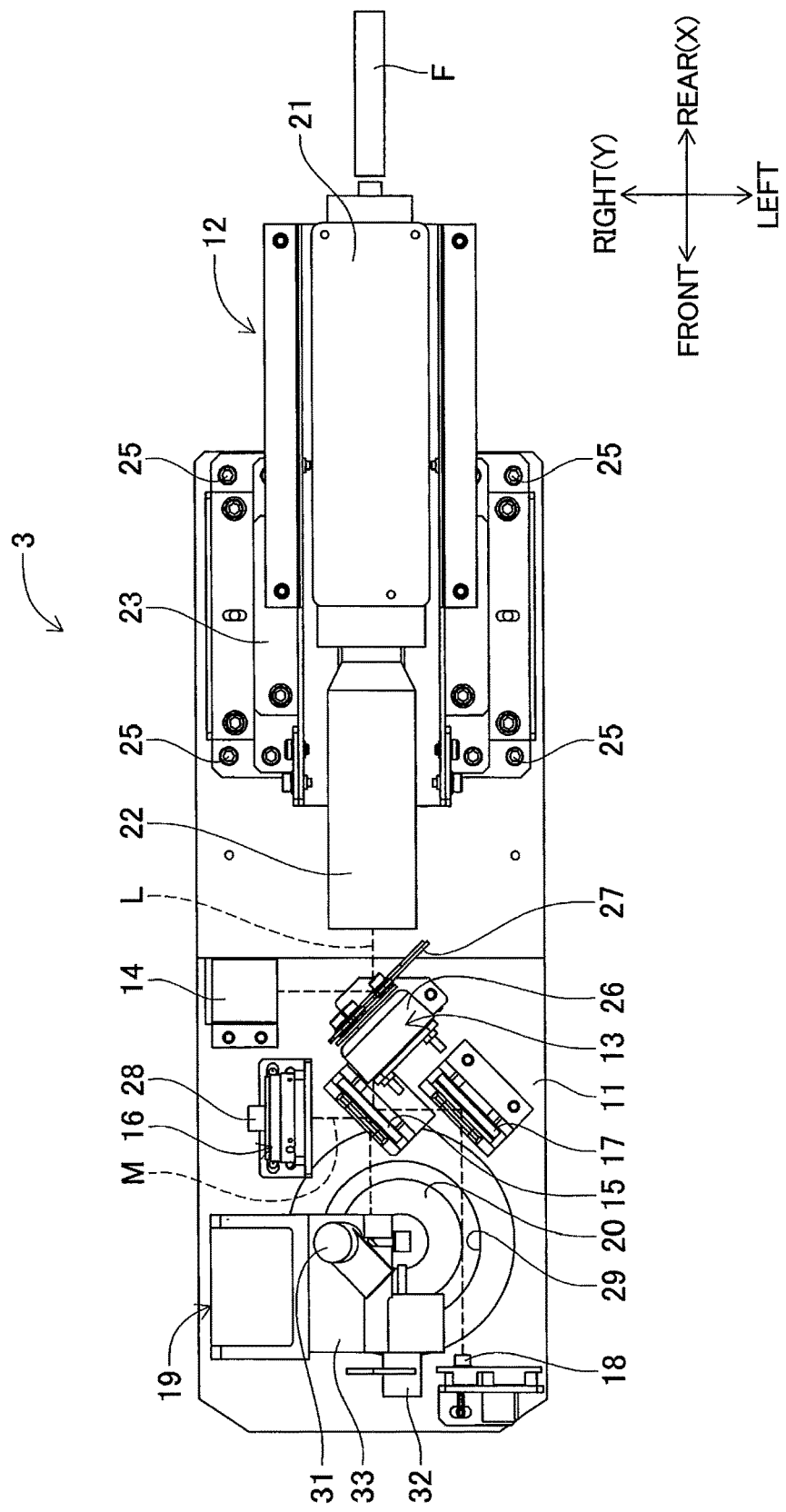
FIG. 2 is a plan view showing a structure of a laser head unit in a laser machining device according to the embodiment.

As illustrated in FIG. 2, the laser head unit 3 includes the main base 11, a laser oscillation unit 12 configured to emit a laser beam L, a light shutter 13, a light damper 14, a half mirror 15, a guide optical section 16, a reflection mirror 17, an optical sensor 18, a galvano scanner 19, and the fθ lens 20. The laser head unit 3 is housed in a substantially cuboid-shaped housing (not shown).

The laser oscillation unit 12 includes the laser oscillator 21, a beam expander 22, and a mounting base 23. The laser oscillator 21 has a fiber connector, a condenser lens, a reflection mirror, a laser medium, a passive Q-switch, an output coupler, and a window, which are accommodated in a casing. The power unit 6 has a semiconductor laser pumping unit 40. The fiber connector is in optical communication with an optical fiber F. Pump light emitted from the semiconductor laser pumping unit 40 is incident via the optical fiber F.

The condenser lens concentrates the pump light incident from the fiber connector. The reflection mirror allows the pump light concentrated by the condenser lens to pass therethrough and simultaneously reflects the laser beam emitted from the laser medium at high efficiency. The laser medium is pumped by the pump light emitted from the semiconductor laser pumping unit 40 to oscillate the laser beam. For example, neodymium doped gadolinium vanadate (Nd:GdVO4) crystal to which neodymium (Nd) is doped as a laser active ion, neodymium doped yttrium vanadate (Nd:YVO4) crystal, and Nd:YAG crystal may be used as the laser medium.

The passive Q-switch is crystal having properties that a penetration rate becomes a value from 80% to 90% when optical energy stored therein exceeds a certain value. Thus, the passive Q-switch functions as a Q-switch for oscillating the laser beam oscillated from the laser medium as a pulse laser having a pulse shape. For example, chrome YAG (Cr:YAG) crystal and Cr:MgSiO4 crystal may be used as the passive Q-switch.

The output coupler constitutes the reflection mirror and a laser resonator. The output coupler is, for example, a partial reflection mirror configured of a concave mirror having a surface coated with a dielectric layer film. The partial reflection mirror has a reflection rate from 80% to 95% in a wavelength of 1063 nm. The window is formed of synthetic silica and the like, and allows the laser beam emitted from the output coupler to pass therethrough outwardly. Thus, the laser oscillator 21 oscillates the pulse laser through the passive Q-switch, and outputs the pulse laser as the laser beam L for performing the marking machining on the surface of the test piece W.

The beam expander 22 changes a beam diameter of the laser beam L, and is attached in coaxial relation to the axis of the laser oscillator 21. The laser oscillator 21 is mounted on the mounting base 23 so as to capable of adjusting an optical axis of the laser beam L. The mounting base 23 is fixed by each mounting screw 25 at a position rearward from the center position in the frontward/rearward directions with respect to the upper surface of the main base 11.

The light shutter 13 includes a shutter motor 26, and a shutter 27 having a plate shape. The shutter motor 26 is configured of a stepping motor and the like. The shutter 27 is attached to a motor shaft of the shutter motor 26, and coaxially rotates with the same. On one hand, when the shutter 27 is rotated at a position where an optical path of the laser beam L emitted from the beam expander 22 is interrupted, the shutter 27 reflects the laser beam L toward the light damper 14 which is located rightward from the light shutter 13. On the other hand, when the shutter 27 is rotated at a position out of the optical path of the laser beam L emitted from the beam expander 22, the laser beam L emitted from the beam expander 22 is incident upon the half mirror 15 which is located forward from the light shutter 13.

The light damper 14 absorbs the laser beam L reflected by the shutter 27. Heat generation of the light damper 14 is transferred to the main base 11 and thus the light damper 14 is cooled. The half mirror 15 is disposed so that the surface of the half mirror 15 is oriented in diagonally frontward left direction to form 45 degrees with respect to the optical path of the laser beam L. The half mirror 15 allows substantially all the laser beam L incident into the rear side of the half mirror 15 to pass therethrough. A part of the laser beam L incident into the rear side of the half mirror 15 is reflected at 45 degrees so as to be directed toward the reflection mirror 17. The reflection mirror 17 is disposed at a left-side position relative to the central portion on the rear surface of the half mirror 15 upon which the laser beam L is incident.

The guide optical section 16 includes a visible semiconductor laser 28 and a lens array (not shown) for collimating the visible laser beam M emitted from the visible semiconductor laser 28 into a parallel beam. The visible semiconductor laser 28 irradiates the visible laser beam M, such as a red laser beam. The visible laser beam M has a wave length different from that of the laser beam L irradiated from the laser oscillator 21. The guide optical section 16 is disposed at a right-side position relative to the central portion of the front surface of the half mirror 15 from which the laser beam L is emitted. As a result, the visible laser beam M is incident upon the central portion from which the laser beam L is emitted of the front for reflection surface of the half mirror 15 with an incident angle of 45 degrees with respect to the reflection surface of the half mirror 15. Then, the visible laser beam M is reflected upon the reflection surface of the half mirror 15 with a reflection angle of 45 degrees and advances along the optical path of the laser beam L. That is, the visible semiconductor laser 38 irradiates the visible laser beam M along the optical path of the laser beam L.

The reflection mirror 17 is disposed in the optical path of the laser beam L in an orientation to face diagonally frontward left direction to form 45 degrees relative to the frontward direction parallel to the optical path. A part of the laser beam L reflected upon the rear surface of the half mirror 15 is incident upon the central portion of the reflection surface of the reflection mirror 17 at an incident angle of 45 degrees. The reflection mirror 17 directs the laser beam L incident upon the reflecting surface of the reflection mirror 17 in the frontward direction at a reflection angle of 45 degrees.

The optical sensor 18 is configured from a photodetector capable of detecting light intensity of the laser beam L and the like. As illustrated in FIG. 2, the optical sensor 18 is disposed in front of the reflection mirror 17 so as to receive the laser beam L emitted from the central portion of the reflection mirror 17 upon which the laser beam L is reflected. With such a positional relationship between the reflection mirror 17 and the optical sensor 18, the light intensity of the laser beam L can be detected. In this manner, the light intensity of the laser beam L emitted from the laser oscillator 21 can be detected with the optical sensor 18.

An opening 29 is formed in a front portion of the main base 11. The galvano scanner 19 is disposed above the opening of the main base 11 and directs the laser beam L emitted from the laser oscillation unit 12 and the visible laser beam M reflected upon the rear surface of the half mirror 15 downward through the opening and performs two-dimensional scan. More specifically, the galvano scanner 19 includes a galvano X-axis motor 31, a galvano Y-axis motor 32, and a main unit 33. The galvano X-axis motor 31 and the galvano Y-axis motor 32 are mounted on the main unit 33. The motor shafts of the galvano X-axis motor 31 and the galvano Y-axis motor 32 are inserted into the respective openings formed in the main unit 33, and are arranged orthogonal to each other. A scan mirror is movably attached to the tip end of each motor shaft. Thus, in the galvano scanner 19, the two scan mirrors diagonally face each other and perform two-dimensional scans while moving in cooperation with each other. Controlling the rotations of the galvano X-axis motor 31 and the galvano Y-axis motor 32 changes the reflecting angles of the respective scan mirrors. As a result, the laser beam L and the visible laser beam M are directed downward and perform two-dimensional scans for scanning the laser beams frontward/rearward direction (X direction) and leftward/rightward direction (Y direction).

The fθ lens 20 operates to coaxially collimate the two-dimensionally scanning laser beam L and the visible laser beam M onto the surface of the workpiece (test piece W) disposed below the fθ lens 20. In this manner, by controlling the rotations of the galvano X-axis motor 31 and the galvano Y-axis motor 32, the laser beam L and the visible laser beam M perform two-dimensional scan in both frontward/rearward direction (X direction) and leftward/rightward direction (Y direction) on the surface of the test piece W, thereby forming a desired machining pattern on the test piece W.

Schematic Configuration of Power Unit 6

Next, the schematic configuration of the power unit 6 in the laser machining device 1 will be described with reference to FIG. 1. As illustrated in FIG. 1, the power unit 6 includes the semiconductor laser pumping unit 40, a laser driver 51, a power supply part 52, and a cooling unit 53, which are provided in a casing 55. The power supply part 52 supplies a driving current for driving the semiconductor laser pumping unit 40 to the semiconductor laser pumping unit 40 through the laser driver 51. The laser driver 51 drives the semiconductor laser pumping unit 40 by DC drive according to driving data inputted from the laser controller 5.

The semiconductor laser pumping unit 40 is optically connected to the laser oscillator 21 through the optical fiber F. When a pulse-shaped driving current is inputted from the laser driver 51, the semiconductor laser pumping unit 40 injects, into the optical fiber F, the pump light as a laser beam having a wavelength whose output is proportional to a current value exceeding a current threshold at which a laser beam is generated. Thus, the pump light from the semiconductor laser pumping unit 40 is injected into the laser oscillator 21 via the optical fiber F. For example, a laser bar using the GaAs may be used as the semiconductor laser pumping unit 40.

The cooling unit 53 is provided for keeping the temperature of the power supply part 52 and the semiconductor laser pumping unit 40 within a prescribed range. The cooling unit 53 controls the temperature of the semiconductor laser pumping unit 40 by, for example, an electron cooling system to finely adjust an oscillation wavelength of the semiconductor laser pumping unit 40. A cooling unit using a water-cooled system or an air-cooled system may be used as the cooling unit 53.

Control System of Laser Machining System 100

Figure 3:
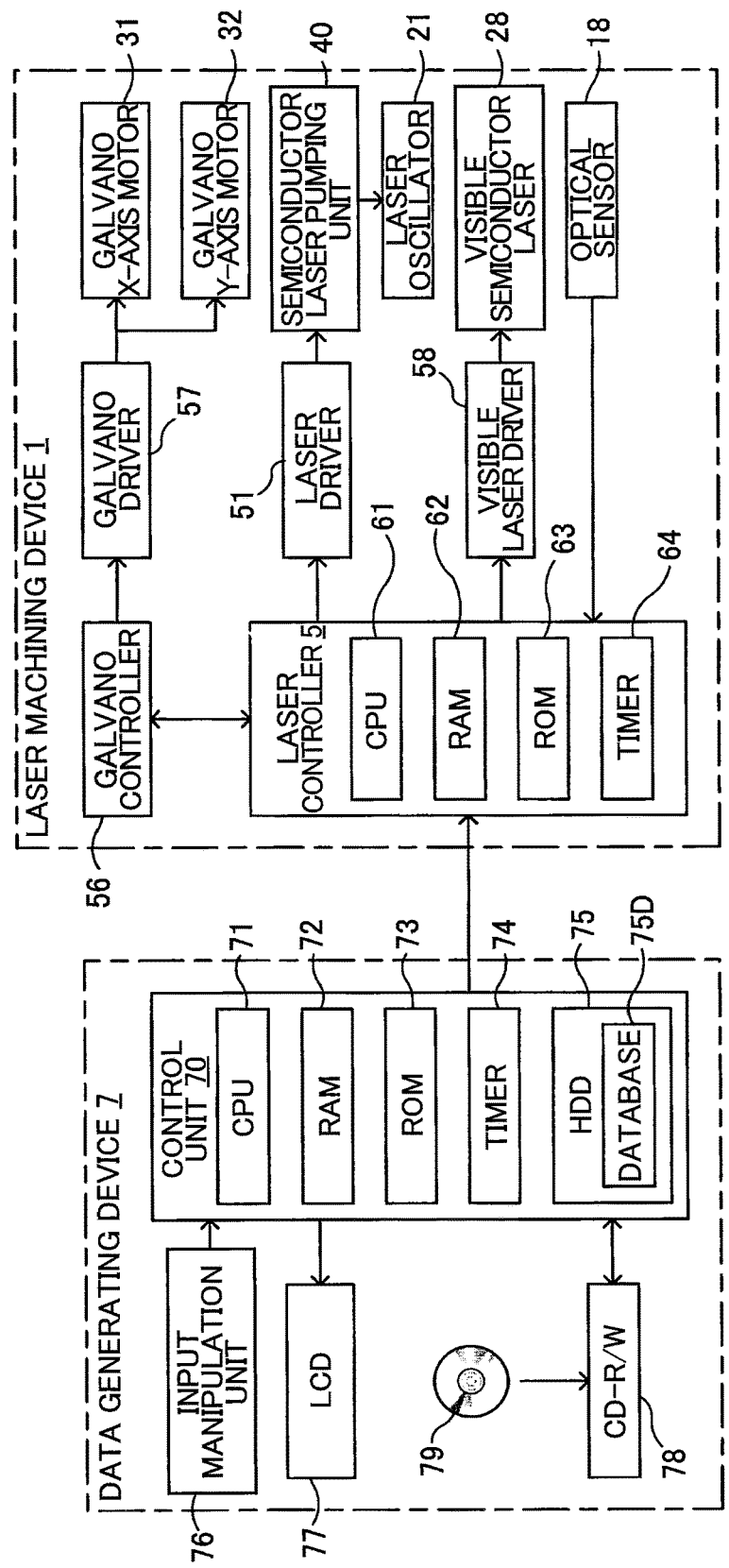
FIG. 3 is a block diagram showing a configuration of a control system in the laser machining system.

Next, the configuration of the control system of the laser machining device 1 constituting the laser machining system 100 will be described with reference to the drawings. As illustrated in FIG. 3, the laser machining device 1 includes the laser controller 5 for governing overall operations of the laser machining device 1, the laser driver 51, a galvano controller 56, a galvano driver 57, a visible laser driver 58, and the like. The laser controller 5 is in electrical communication with the laser driver 51, the galvano controller 56, the optical sensor 18, the visible laser driver 58, and the like.

The laser controller 5 includes a central processing unit (CPU) 61, a random access memory (RAM) 62, a read-only memory (ROM) 63, a timer 64, and the like. The CPU 61 is provided as an arithmetic device and a control device for governing overall operations of the laser machining device 1. The timer 64 is provided for measuring time. The CPU 61, the RAM 62, the ROM 63, and the timer 64 are interconnected via a bus line (not shown), and are in data communication with one another.

The RAM 62 temporarily stores various results of arithmetic operations performed by the CPU 61, X- and Y-coordinate data of a drawing pattern, and the like. The ROM 63 stores various kinds of programs including a program for performing arithmetic operations to obtain X- and Y-coordinate data of a drawing pattern according to drawing data transmitted from the data generating device 7 and store the X- and Y-coordinate data in the RAM 62. Specifically, drawing data inputted from the data generating device 7 represents images defined by positional information. A set of consecutive points derived from the positional information are treated as either a single straight line or an elliptic segment curved line, and X- and Y-coordinate data for each of such lines is obtained to define a drawing pattern. The ROM 63 stores data regarding start point, end point, focal point, and curvature of each elliptic segment curved line that constitute a character with one of a plurality of fonts. Such data is stored in the ROM 43 on a font basis.

The CPU 61 executes various arithmetic and control processes in accordance with the control programs stored in the ROM 63. For example, the CPU 61 receives drawing data from the data generating device 7 and computes X- and Y-coordinate data, galvano scanning speed data, and the like. Then, the CPU 61 outputs the resultant data to the galvano controller 56. Further, the CPU 61 outputs laser drive data for driving the semiconductor laser pumping unit 40 to the laser driver 51. The laser driver data includes data regarding pump light output of the semiconductor laser pumping unit 40, a time duration of outputting the pump light, and the like which are set in accordance with the drawing data inputted from the data generating device 7. Also, the CPU 61 outputs the X- and Y-coordinate data of the drawing pattern, a control signal for instructing ON/OFF of the galvano scanner 19 and the like to the galvano controller 56.

The laser driver 51 drives and controls the semiconductor laser pumping unit 40 according to the laser driving data such as the pump light output of the semiconductor laser pumping unit 40, the time duration of outputting the pump light, and the like inputted from the laser controller 5. Specifically, the laser driver 51 generates a pulse-shaped driving current whose current value is proportional to the pump light output of the laser driving data inputted from the laser controller 5, and outputs the driving current to the semiconductor laser pumping unit 40 for a time duration in accordance with the time duration of outputting the pump light included in the laser driving data. Thus, the semiconductor laser pumping unit 40 injects the pump light having an intensity corresponding to the pump light output into the optical fiber F for the time duration of the outputting the pump light.

The galvano controller 56 computes driving angles and rotational speeds of both the galvano X-axis motor 31 and the galvano Y-axis motor 32 according to the X- and Y-coordinate data, the galvano scanning speed data, and the like of the drawing pattern inputted from the laser controller 5. Motor drive data representing the computed driving angle and the rotational speed is outputted to the galvano driver 57.

The galvano driver 57 drives and controls the galvano X-axis motor 31 and the galvano Y-axis motor 32 according to the motor drive data representing the driving angle and the rotational speed and inputted from the galvano controller 56, thereby performing two-dimensional scan of the laser beam L.

The visible laser driver 58 controls the guide optical section 16 including the visible semiconductor laser 28 according to a control signal outputted from the laser controller 5. The visible laser driver 58 controls, for example, a light amount of the visible laser beam M emitted from the visible semiconductor laser 28 according to the control signal.

As illustrated in FIGS. 1 and 2, the laser controller 5 is connected to the data generating device 7, and the bi-directional communications can be made between the two. The data generating device 7 is configured to be able to receive drawing data indicating machining contents, control parameters of the device main unit 2, various user instructions, and the like from the data generating device 7.

Control System of Data Generating Device 7

The configuration of the control system of the data generating device 7 constituting the laser machining system 100 will be described with reference to the drawings. As illustrated in FIG. 3, the data generating device 7 is configured of a control unit 70 for governing overall operations of the data generating device 7, an input manipulation unit 76, a liquid crystal display (LCD) 77, a CD-R/W 78, and the like. The input manipulation unit 70 includes a mouse, a keyboard, and the like. The CD-R/W is provided for reading from and writing into CD-ROMs 79 various types of data, programs, and the like.

The control unit 70 includes a CPU 71, a RAM 72, a ROM 73, a timer 74, a hard disk drive (HDD) 75, and the like. The CPU 71 is provided as an arithmetic device and a control device for governing overall operations of the data generating device 7. The timer 74 is provided for measuring time. The CPU 71, the RAM 72, the FOM 72, and the timer 74 are interconnected via a bus line (not shown), and are in data communication with one another. The CPU 71 and the HDD 75 are interconnected via an input-output interface (not shown), and are in data communication with each other. The CPU 71 is an example of the controller of the present disclosure.

The RAM 72 temporarily stores various results of arithmetic operation performed by the CPU 71 and the like. The ROM 73 stores various kinds of control programs and data tables.

The HDD 75 is a storage for storing programs of various kinds of application software and various kinds of data files, and includes a database 75D. In the present embodiment, the HDD 75 stores a data generation program (see FIG. 4) for generating scribed circle data D described later, a thickness calibration table described later (see FIG. 10), and a material calibration table described later (see FIG. 11). The HDD 75 is an example of the memory of the present disclosure.

The database 75D is referred when the scribed circle data D described later is generated, and is configured to associate machining contents such as "machining type," "number of processes," and "deformation degree" with drawing information such as "pattern type," "recommended heat input," and "recommended pattern size" about a scribed pattern S (described later) represented by the scribed circle data D and the laser beam L used for drawing the scribed pattern S. The database 75D shows the drawing information recommended for one set of machining contents. The contents of the database 75D will be described later in detail with reference to the drawings.

The CD-R/W 78 reads from and writes into the CD-ROM 79 application programs, various kinds of data tables, and data groups constituting the database 75D. That is, the data generating device 7 reads the data generation program (see FIG. 4), the thickness calibration table described alter (see FIG. 10), and the material calibration table described later (see FIG. 11) from the CD-ROM 79 through the CD-R/W 78, stores them in the HDD 75, and generates the database 75D in the HDD 75 by storing the various data groups therein.

The data generation program (see FIG. 4), the thickness calibration table described later (see FIG. 10), the material calibration table described later (see FIG. 11), and the database 75D may be stored in the ROM 73, read from a storage medium such as the CD-ROM 79, or downloaded through network such as an Internet and the like (not shown).

The control unit 70 is electrically connected to the input manipulation unit 76 including a mouse, a keyboard, and the like, the LCD 77, and the like via an input-output interface (not shown). The data generating device 7 generates the drawing data including the scribed circle data D and sets the control parameters by using the input manipulation unit 76 and the LCD 77.

Data Generation Program

Next, a data generation process performed by the data generating device 7 using the data generation program will be described in detail with reference to FIGS. 4 through 11. The data generation program is an application program for generating the scribed circle data D representing a scribed pattern S as an index pattern drawn on the surface of the test piece W as the workpiece in a scribed circle test described later, and is executed by the CPU 71. The scribed circle data D is an example of the drawing data of the present disclosure, and the scribed pattern S is an example of the index pattern of the present disclosure.

Configuration of Scribed Circle Data D

The scribed circle data D generated by executing the data generation program will be described with reference to FIG. 5. In a scribed circle test, a pattern (circle or grid-like pattern, for example) configured by arranging a plurality of unit graphics U is drawn as an index pattern on the surface of the test piece W as the workpiece in advance, and then a machining process such as press working is applied to the test piece W on which the index pattern has been drawn. Then, the examination of the deformation of the test piece W and the measurement of the strain distribution of the test piece W are performed by measuring a form change of each unit graphics U before and after applying the machining process to the test piece W.

The scribed circle data D is a type of the drawing data for performing marking machining in which the scribed pattern S configured by arranging the plurality of unit graphics U is drawn on the surface of the test piece W as the workpiece. The scribed pattern S represented by the scribed circle data D includes a scribed circle in which circles, as the unit graphic U, having a prescribed size are arranged, a scribed grid in which squares, as the unit graphic U, having a prescribed size are arranged in a grid pattern, and a pattern in which a plurality of circles are concentrically arranged.

In the scribed circle test, when index pattern is a scribed circle, strain distribution is measured by measuring a length of minor and major axes of each ellipse into which a circle as the unit graphic U is transformed, a direction of the central axis of the ellipse, and a center distance between the circles and calculating a maximum strain, a minimum strain, a direction of the maximum strain, and the like. When the index pattern is the scribed grid, strain distribution is measured by measuring changes in length of each side and diagonals of the squares as the unit graphics U before and after the machining process and calculating a maximum strain, a minimum strain, a direction of the maximum strain, and the like.

Figure 5:
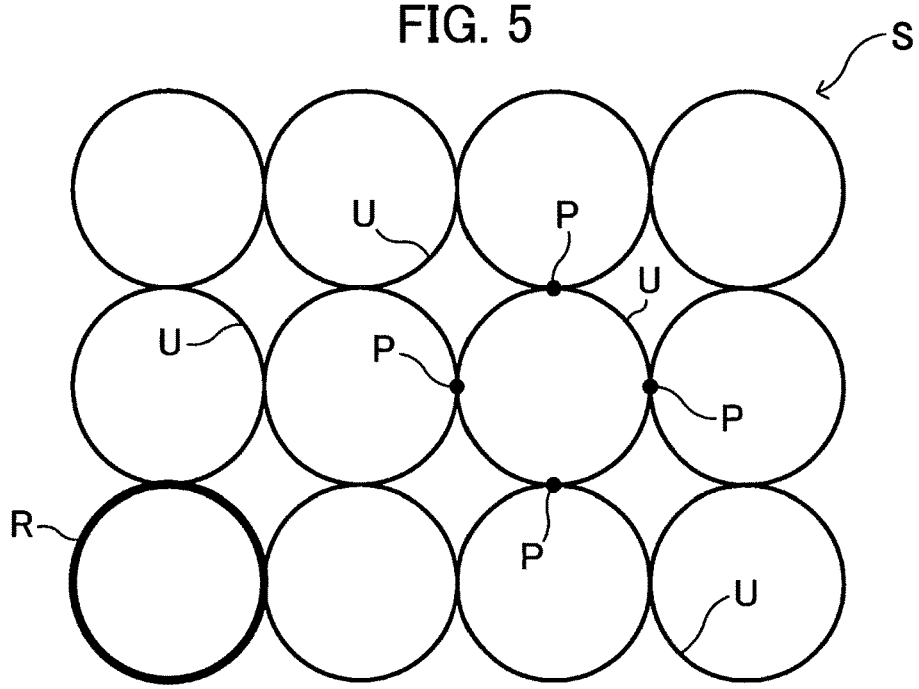
FIG. 5 is an explanatory diagram showing an example of a scribed pattern represented by scribed circle data.

As illustrated in FIG. 5, the scribed pattern S represented by the scribed circle data D includes intersections P and a reference index R in the present embodiment. Each intersection P is a point where the lines or the unit graphics U in the scribed pattern S intersect with each other. The reference index R indicates the position of one unit graphic U among a plurality of unit graphics U constituting the scribed pattern S drawn by the scribed circle data D, and the one unit graphic U serving as the reference index R is drawn with a line type different from that of the other unit graphics U in the example illustrated in FIG. 5. The relative position of each of the other unit graphics U is measured with respect to the reference index R serving as the reference.

Data Generation Process According to Data Generation Program

Figure 4:
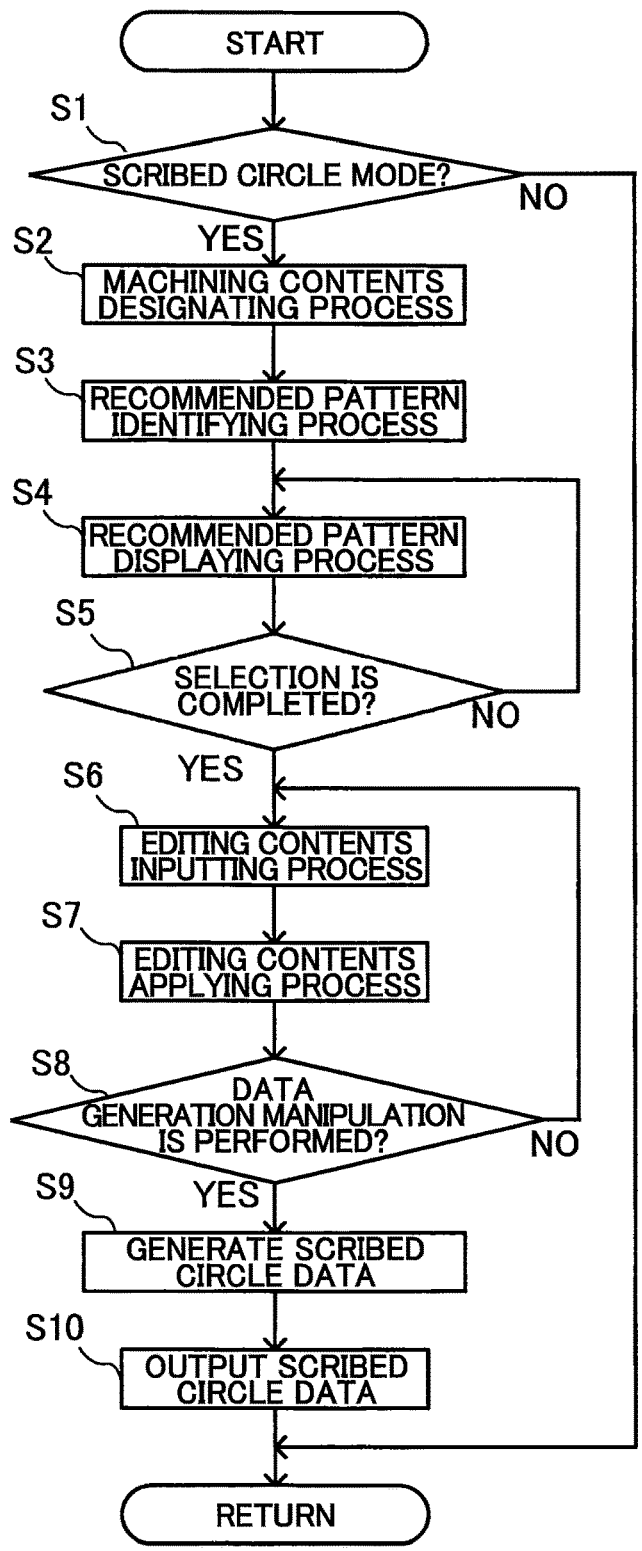
FIG. 4 is a flowchart illustrating steps in a data generation process executed by a CPU according to a data generation program.

As illustrated in FIG. 4, when execution of the data generation program is launched, in S1 the CPU 71 firstly determines whether a scribed circle mode is set. In S1 the CPU 71 makes a determination as to whether the scribed mode is set according to whether to receive a generation instruction instructing to generate scribed circle data D. The scribed circle mode is a mode in which the data generating device 7 generates the scribed circle data D as the drawing data. In the present embodiment, the scribed circle mode is set when a prescribed manipulation is made on the input manipulation unit 76 and the generation instruction instructing to generate the scribed circle data D is received.

Thus, the CPU 71 makes the determination in Si according to an input signal from the input manipulation unit 76. If the scribed circle mode is set (S1: YES), the CPU 71 advances to S2. On the other hand, if the scribed mode is not set (S1: NO), the CPU 71 terminates the execution of the data generation program.

In S2, the CPU 71 performs a machining contents designating process. Specifically, the CPU 71 displays a machining contents input window 80 described later on the LCD 77 and accepts input of a set of machining contents via the machining contents input window 80. The machining contents indicate contents of a machining process to be performed on the test piece W in the scribed circle test. In the present embodiment, each set of machining contents includes "machining type," "number of processes," and "deformation degree."

Configuration of Machining Contents Input Window

Figure 6:
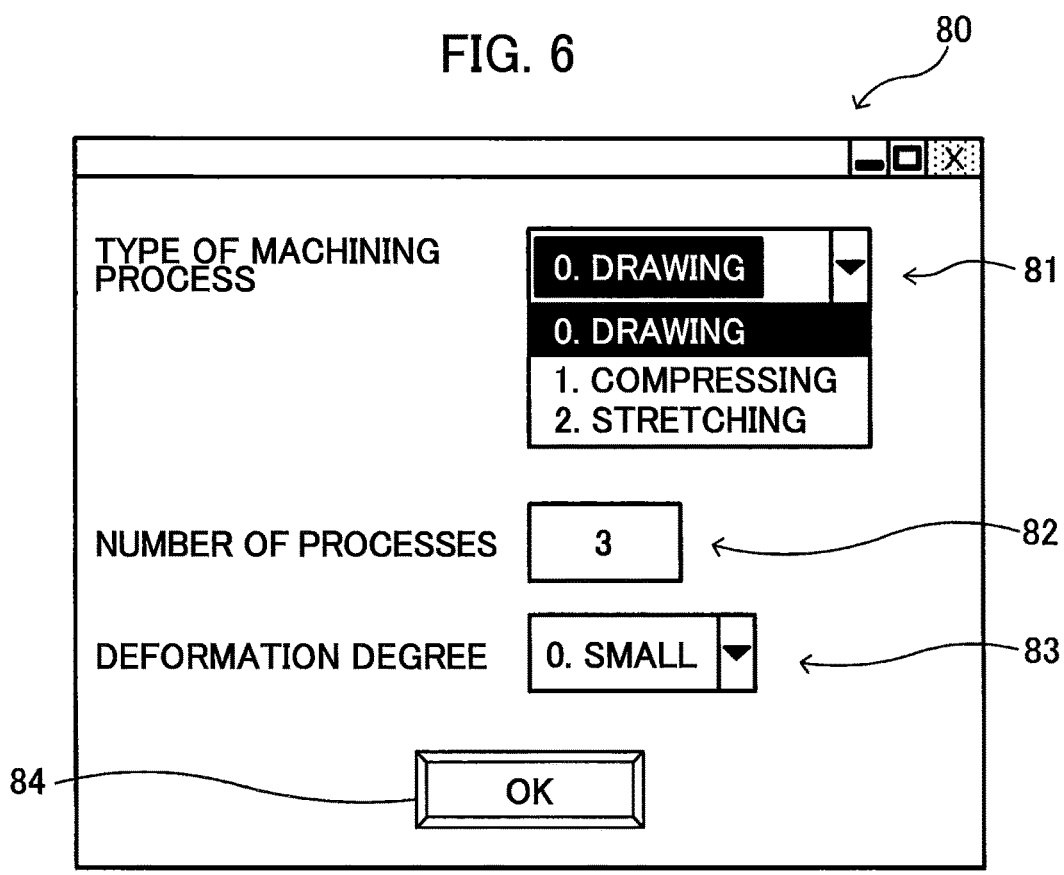
FIG. 6 is an explanatory diagram showing a display example of a machining contents input window.

The machining contents input window 80 displayed on the LCD 77 in the machining contents designating process of S2 will be described in detail with reference to the drawings. As illustrated in FIG. 6, the machining contents input window 80 includes a machining type designating part 81, a number of processes designating part 82, a deformation degree designating part 83, and an OK button 84.

The machining type designating part 81 is used for inputting and designating the "machining type" as the machining contents. The term "machining type" means a type of the machining to be applied to the test piece W in the scribed circle test, and includes "drawing," "compressing," and "stretching," those are selectably displayed on the machining type designating part 81, in the present embodiment. In the machining contents designating process of S2, selected one of the machining types of the machining process in the scribed circle test can be designated as one of the machining contents upon receipt of user's manipulation on the machining type designating part 81 through the input manipulation unit 76.

The number of processes designating part 82 is used for inputting and designating the "number of processes" as the machining contents. The term "number of processes" means number of processes in the machining to be applied to the test piece W until completion of the scribed circle test. In the machining contents designating process of S2, entered number of processes until completion of the scribed circle test can be designated as one of the machining contents upon receipt of user's manipulation on the number of processes designating part 82 through the input manipulation unit 76.

The deformation degree designating part 83 is used for inputting and setting the "deformation degree" as the machining contents. The term "deformation degree" means the degree of deformation at the most deformed part in the test piece W to be deformed through application of the machining in the scribed circle test, and includes "large," "medium," and "small," those are selectably displayed on the deformation degree designating part 83, in the present embodiment. In the machining contents designating process of S2, selected one of the deformation degrees of the test piece W in the scribed circle test can be designated as one of the machining contents upon receipt of user's manipulation on the deformation degree designating part 83 through the input manipulation unit 76.

The OK button 84 is operated for designating a set of machining contents inputted through the machining type designating part 81, the number of processes designating part 82, and the deformation degree designating part 83 as the machining contents. Thus, in the present embodiment, the CPU 71 stores the contents inputted through the machining type designating part 81, the number of processes designating part 82, and the deformation degree designating part 83 as the machining contents in the RAM 72 upon depression of the OK button 84, and ends the machining contents designating process of S2. Subsequently, the CPU 71 advances to S3.

In S3 the CPU 71 performs a recommended pattern identifying process. Specifically, the CPU 71 identifies details of one or more scribed patterns S recommended for the machining contents (hereinafter referred to as a recommended pattern) in the generation of the scribed circle data D according to the machining contents designated in the machining contents designating process of S2 and the contents stored in the database 75D. After one or more recommended patterns are identified, the CPU 71 ends the recommended pattern identifying process of S3, and advances to S4.

Contents of Database 75D

The contents of the database 75D referred in the recommended pattern identifying process of S3 will be described in detail with reference to the drawings. As illustrated in FIG. 7, the database 75D is configured to associate the machining contents including the "machining type," "number of processes," and "deformation degree" regarding the machining to be applied to the test piece W with the drawing information indicating a drawing form of one scribed pattern S and including the "pattern type," "recommended heat input," "recommended pattern size," and the like.

In the database 75D, the term "pattern type" indicates an arrangement pattern of unit graphics U, e.g., an array pattern of graphics in the scribed pattern S such as the scribed circle, scribed grid, and circles arrayed concentrically, for example. The term "recommended heat input" indicates a heat amount inputted per unit area on the surface of the test piece W by the laser beam L (that is, a hat amount applied by the laser beam L). Since the heat input of the laser beam L indicates the drawing form (machining depth, line width, and intensity) drawn on the test piece W by the laser beam L, the term "recommended heat input" indicates a recommended drawing form for the recommended pattern. The heat input of the laser beam L can be changed, for example, by changing a sweep speed of the laser beam L. As the sweep speed of the laser beam L becomes faster, the heat amount applied per unit area on the test piece W becomes smaller, and thus the heat input of the laser beam L becomes lower. The sweep speed of the laser beam L at 300 mm/s can be set to "recommended heat input: high," 200 mm/s "recommended heat input: medium," and 500 mm/s "recommended heat input: low." Alternately, an output intensity of the laser beam L may be changed while keeping the sweep speed of the laser beam L constant in order to change the heat input of the laser beam L. Further, both of the output intensity of the laser beam L and the sweep speed of the laser beam L may be changed in order to change the heat input. The term "recommended pattern size" means the size of each unit graphic U constituting the scribed pattern S whose type is identified by the "pattern type." Each set of drawing information such as the "pattern type," "recommended heat input," and "recommended pattern size" indicates the drawing form of one scribed pattern S.

The details of the recommended pattern identifying process of S3 will be described with a specific example while referring to FIG. 7. When "machining type: stretching", "number of processes: 5", and "deformation degree: small" are designated as the machining contents, for example, in S3 the CPU 71 identifies, as the recommended pattern, the scribed pattern S having the drawing form specified by "pattern type: pattern (3)," "recommended heat input: medium," and "recommended pattern size: medium" according to the designated machining contents and the contents of the database 75D. The CPU 71 stores one or more recommended patterns identified according to the machining contents designated in the machining contents designating process of S2 into the RAM 72, and then advances to S4.

In S4 the CPU 71 performs a recommended pattern displaying process. Specifically, the CPU 71 displays a recommended pattern display window 85 on the LCD 77, and displays one or more recommended patterns identified in the recommended pattern identifying process of S3. After displaying the recommended pattern display window 85 on the LCD 77, the CPU 71 advances to S5.

Configuration of Recommended Pattern Display Window

Figure 8:
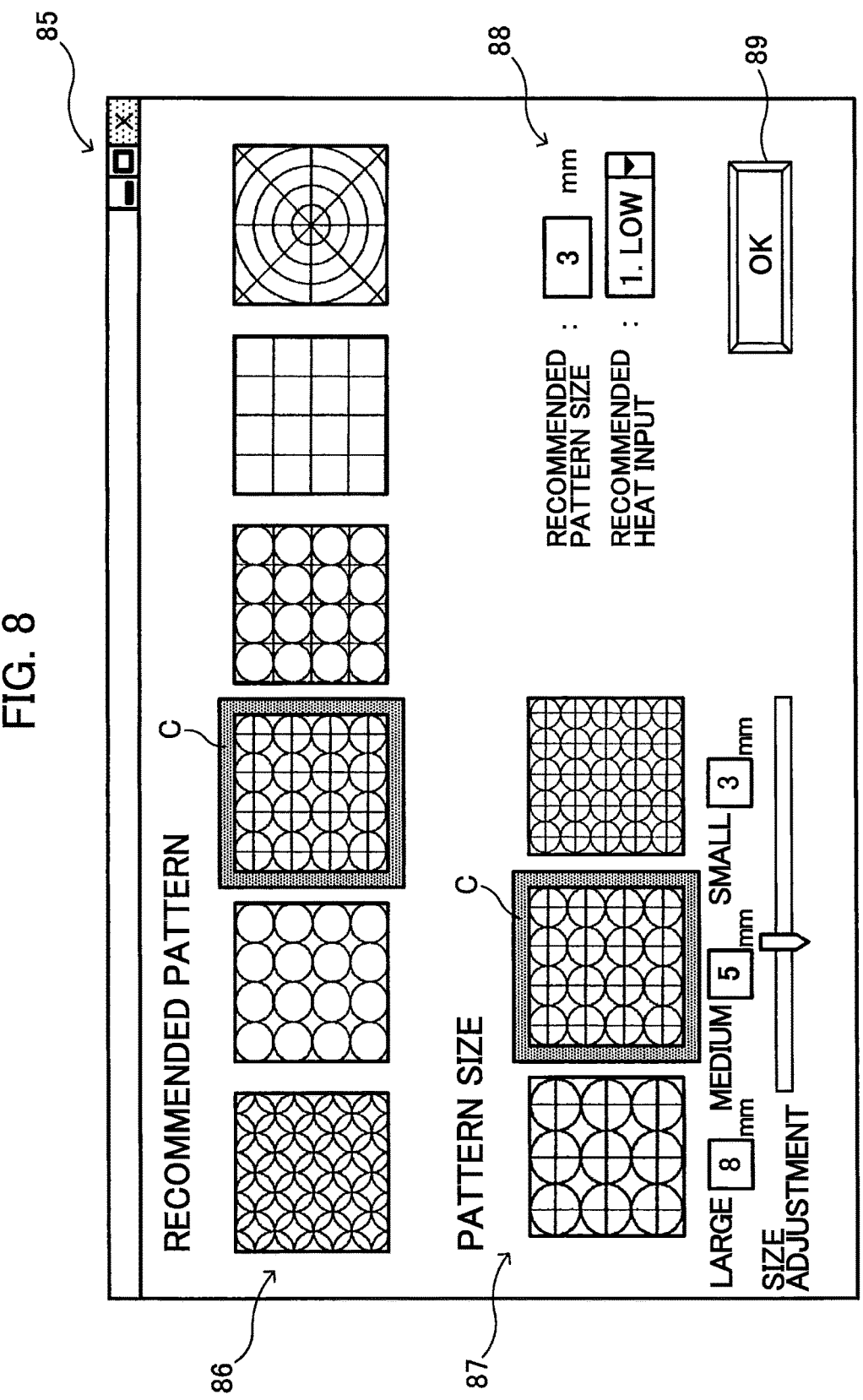
FIG. 8 is an explanatory diagram showing a display example of a recommended pattern display window.

The configuration of the recommended pattern display window 85 displayed on the LCD 77 in the recommended pattern displaying process of S4 will be described in detail with reference to the drawings. As illustrated in FIG. 8, the recommended pattern display window 85 includes a recommended pattern display part 86, a pattern size selection part 87, a recommended condition display part 88, selection cursors C, and an OK button 89.

As illustrated in FIG. 8, drawing examples respectively corresponding to one or more recommended patterns identified in the recommended pattern identifying process of S3 are displayed in the recommended pattern display part 86 to be presented to the user. The selection cursor C for selecting one of the recommended patterns desired by the user among one or more recommended patterns is displayed in the recommended pattern display part 86. Thus, the user can arbitrarily select one recommended pattern among one or more recommended patterns displayed in the recommended pattern display part 86 by manipulating the selection cursor C via the input manipulation unit 76, and the selected recommended pattern can be set as the scribed pattern S used for generating the scribed circle data D.

In the present embodiment, the drawing examples respectively corresponding to one or more recommended patterns identified in the recommended pattern identifying process of S3 are displayed in the recommended pattern display part 86. However, various modifications can he employed, provided that one or more recommended patterns can be presented. For example, one or more recommended patterns may be presented such that drawing examples corresponding to all scribed patterns S are displayed and a distinguishable mark (frame, for example) is added to the identified recommended pattern.

The pattern size selection part 87 receives a change in size of the unit graphics U constituting the recommended pattern. The size of the unit graphics U can be selected in the pattern size selection part 87 among "large," "medium," and "small" by use of the selection cursor C. When the recommended pattern display window 85 is initially displayed at an initial stage, the selection cursor C is displayed in a state where the "recommended pattern size" identified in the recommended pattern identifying process of S2 is selected. The pattern size selection part 87 has a slider for adjusting the size of the unit graphics U by dragging thereof.

The recommended condition display part 88 displays the "recommended pattern size" and "recommended heat input" identified in the recommended pattern identifying process of S3. The selection of one recommended pattern used for generating the scribed circle data D and the setting of the size of the unit graphics U in the recommended pattern are completed upon depression of the OK button 89.

In S5 the CPU 71 determines whether the selection of the recommended pattern is completed according to a manipulation signal outputted upon depression of the OK button 89 in the recommended pattern display window 85. If the selection of the recommended pattern is completed (S5: YES), the CPU 71 stores one selected recommended pattern and the size of the unit graphics U used for generating the scribed circle data D into the RAM 72, and advances to S6. On the other hand, if the selection of the recommended pattern is not completed (S5: NO), the CPU 71 returns to S4, and receives the selection of the recommended pattern and the like.

In S6 the CPU 71 performs an editing contents inputting process. Specifically, the CPU 71 displays a pattern editing window 90 on the LCD 77, and accepts the edit of items related to the drawing of the scribed pattern S. After displaying the pattern editing window 90 on the LCD 77, the CPU 71 advances to S7.

Configuration of Pattern Editing Window

Figure 9:
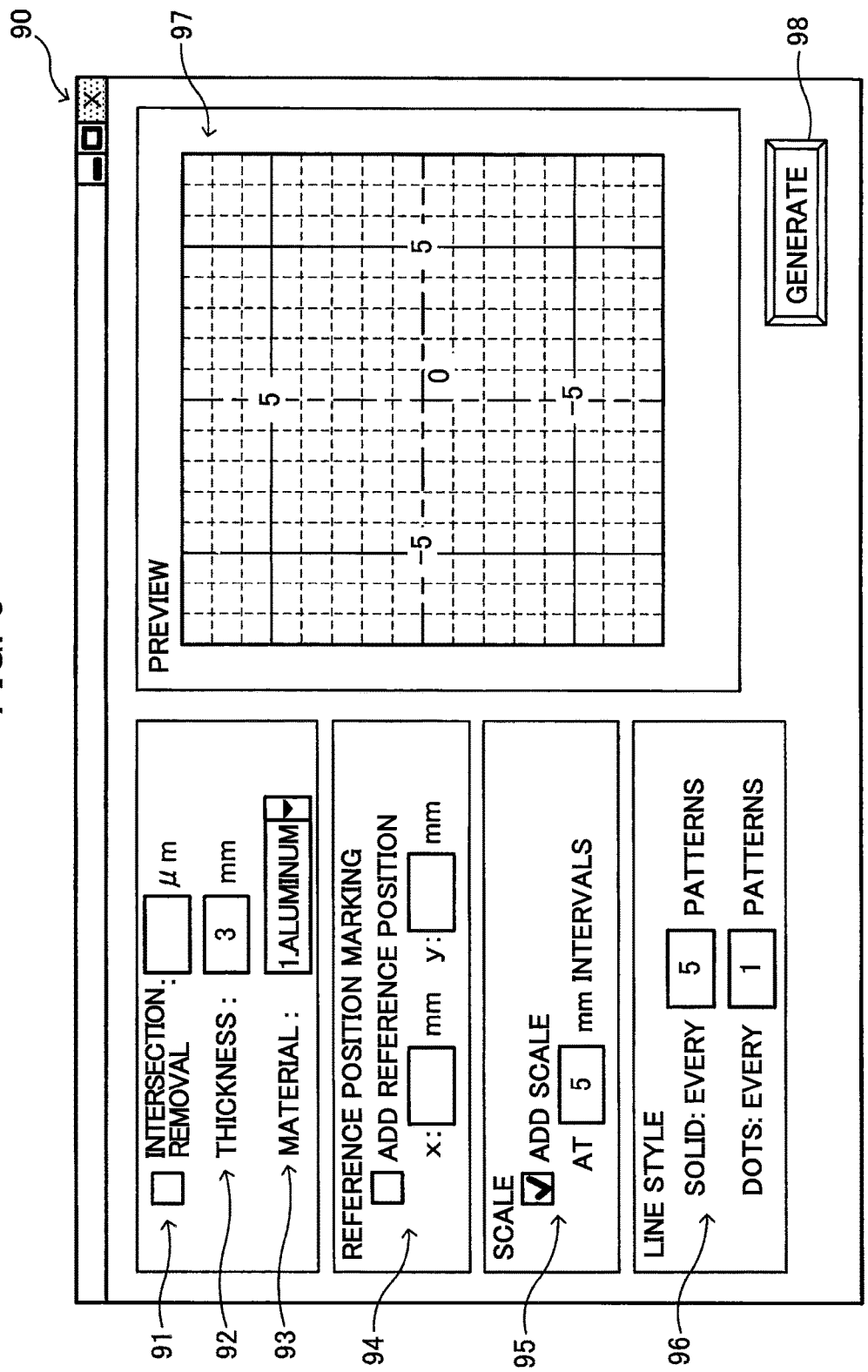
FIG. 9 is an explanatory diagram showing a display example of a pattern editing window.

The pattern editing window 90 displayed on the LCD 77 in the editing contents inputting process of S6 will be described in detail with reference to the drawings. As illustrated in FIG. 9, the pattern editing window 90 includes an intersection removal setting part 91, a thickness setting part 92, a material setting part 93, a reference index position setting part 94, a scale setting part 95, a line style setting part 96, a preview part 97, and a generate button 98.

The intersection removal setting part 91 is a part for setting whether to perform intersection removal and inputting the range of the intersection removal. In the intersection removal, each intersection P between graphics (unit graphics U and line segments) constituting the scribed pattern S (see FIG. 5) is removed from a drawing object drawn by the laser beam L. The range of the intersection removal is set by using the intersection P as a reference. As the intersection P is subjected to the repeated irradiation of the laser beam L, the deformation of the test piece W may be affected. By setting to perform the intersection removal through the intersection removal setting part 91 and generating the scribed circle data D representing the scribed pattern S in which each intersection P is removed, the effect on the deformation of the test piece W in the scribed circle test can be reduced.

The thickness setting part 92 is a part for accepting input of a thickness of the test piece W used in the scribed circle test. The CPU 71 changes the heat input of the laser beam L per unit area on the surface of the test piece W according to the inputted thickness of the test piece W when the scribed pattern S is drawn on the surface of the test piece W according to the scribed circle data D. As the heat applied by the laser beam L per unit area on the surface of the test piece W becomes higher, the effect on the deformation of the test piece W may become greater. The heat input of the laser beam L is changed in accordance with the thickness of the test piece W inputted on the thickness setting part 92, thereby reducing the effect on the deformation of the test piece W in the scribed circle test.

The material setting part 93 is a part for accepting input of material of the test piece W used in the scribed circle test. The CPU 71 changes the heat input of the laser beam L per unit area on the surface of the test piece W according to the inputted material of the test piece W when the scribed pattern S is drawn on the surface of the test piece W according to the scribed circle data D. Even if the heat input of the laser beam L per unit area on the surface of the test piece W is equal, a substantial effect level on the surface of the test piece W is not equal under conditions where the material of the test piece W is different. Thus, the machining of the test piece W with the laser beam L may greatly affect the deformation of the test piece W depending on the material of the test piece W. The heat input of the laser beam L is changed in accordance with the material of the test piece W inputted on the material setting part 93, thereby reducing the effect on the deformation of the test piece W in the scribed circle test.

The reference index position setting part 94 is a part for setting whether to draw the reference index R (see FIG. 5) indicating a relative positional relationship in the scribed pattern S represented by the scribed circle data D and inputting a drawing position of the reference index R. The drawing of the reference index R is accepted by checking a checkbox on the reference position setting part 94. In this case, the reference index R is inserted in the inputted drawing position and indicates the relative positional relationship of the unit graphics U in the scribed pattern S represented by the scribed circle data D. Thus, when the scribed pattern S according to the scribed circle data D including the reference index R is drawn on a surface of a test piece W and the scribed circle test is executed using the test piece W, the relative positional relationship of the unit graphics U included in the scribed pattern S can be identified on the basis of the reference index R, thereby easily examining the deformation of the test piece W and measuring the strain thereof.

The scale setting part 95 is a part for setting whether to add a scale as a kind of reference index and inputting a scale resolution. The scale indicating the relative positional relationship in the scribed pattern S represented by the scribed circle data D is inserted by checking a checkbox and inputting the scale resolution on the scale setting part 95. When the scribed pattern S according to the scribed circle data D in which the scale is inserted is drawn on a surface of a test piece W and the scribed circle test is executed using the test piece W, the relative positional relationship in the scribed pattern S can be identified on the basis of the scale, thereby easily examining the deformation of the test piece W and measuring the strain thereof.

The line style setting part 96 is a part for setting types of lines (line style) for drawing the reference index R set through the reference position setting part 94 and the scale set through the scale setting part 95. Thus, the relative positional relationship of the scribed pattern S can be identified on the basis of the line style inputted on the line style setting part 96, thereby enhancing convenience of the generation of the scribed circle data D and the convenience of the test as to the deformation of the test piece W.

The preview part 97 is a part for displaying a drawing example of the scribed pattern S according to the recommended pattern selected in the recommended pattern displaying process of S4 in a state where the editing content inputted on the pattern editing window 90 in the editing contents inputting process of S6 is applied. Visually contacting the preview part 90, a user can determine whether to apply the editing contents inputted on the pattern editing window 90, and the scribed circle data D representing a desired scribed pattern S can be generated. Upon depressing the generate button 98, the scribed circle data D to which the current editing contents is applied is generated.

In S7 the CPU 71 performs an editing contents applying process. Specifically, the CPU 71 applies the editing contents inputted on the pattern editing window 90 to the current scribed pattern S according to the selected one recommended pattern. For example, when the input of the intersection removal on the intersection removal setting part 91 is accepted, the CPU 71 edits the scribed pattern S so as to remove each intersection P therein (to exclude the intersection P from the drawing object).

Further, if the thickness of the test piece W is inputted on the thickness setting part 92 of the pattern editing window 90, in S7 the CPU 71 changes the heat amount applied by the laser beam L per unit area on the surface of the test piece W at the time of drawing the scribed pattern S according to the scribed circle data D using the thickness calibration table (see FIG. 10) and the inputted thickness of the test piece W.

Contents of Thickness Calibration Table

The thickness calibration table referred when the scribed circle data D is edit in association with the thickness of the test piece W in the editing contents applying process of S7 will be described in detail with reference to FIG. 10. The thickness calibration table is configured to associate the thickness of the test piece W with a maximum value of the heat input (hereinafter referred to as a maximum heat input) by the laser beam L during drawing the scribed pattern S on the surface of the test piece W.

More specifically, in the thickness calibration table, as the thickness of the test piece W becomes greater, the corresponding maximum heat input during drawing the scribed pattern S on the surface of the test piece W becomes greater. The effect on the deformation of the test piece W may become greater as the heat amount applied by the laser beam L per unit area on the surface of the test piece W becomes greater. The thicker the thickness of the test piece W is, the greater heat amount the test piece W can accept.

In the editing contents applying process of S7 according to the present embodiment, the CPU 71 compares the maximum heat input identified by the thickness of the test piece W in the thickness calibration table (see FIG. 10) with the recommended heat input identified in the recommended pattern identifying process of S3. If the maximum heat input identified by the thickness of the test piece W is greater than the recommended heat input, the CPU 71 sets the recommended heat input as the heat input during drawing the scribed pattern S according to the scribed circle data D. On the other hand, if the maximum heat input identified by the thickness of the test piece W is smaller than the recommended heat input, the CPU 71 restricts the heat input during drawing the scribed pattern S according to the scribed circle data D to the maximum heat input instead of the recommended heat input. As described above, the heat input during drawing the scribed pattern S according to the scribed circle data D is calibrated in accordance with the thickness of the test piece W, thereby reducing the effect on the deformation of the test piece W in the scribed circle test.

If the material of the test piece W is inputted on the material setting part 93 of the pattern editing window 90, in S7 the CPU 71 changes the heat amount applied by the laser beam L per unit area on the surface of the test piece W at the time of drawing the scribed pattern S according to the scribed circle data D using the inputted material of the test piece W and the material calibration table (see FIG. 11).

Contents of Material Calibration Table

The material calibration table referred when the scribed circle data D is edit in association with the material of the test piece W in the editing contents applying process of S7 will be described in detail with reference to FIG. 11. The material calibration table is configured to associate the material of the test piece W with a scale factor for the heat input of the laser beam L during drawing the scribed pattern S on the surface of the test piece W.

More specifically, in the material calibration table, as the heat conductivity of the material of the test piece W becomes greater, the corresponding scale factor for the heat input during drawing the scribed pattern S on the surface of the test piece W becomes smaller. Even if the heat input of the laser beam L per unit area on the surface of the test piece W is equal, a substantial effect level of the laser beam L on the surface of the test piece W is not equal under conditions where the material of the test piece W is different and the heat conductivity of that is different. Thus, the machining on the test piece W with the laser beam L may greatly affect the deformation of the test piece W depending on the material (heat conductivity) of the test piece W.

In the editing contents applying process of S7 according to the present embodiment, the CPU 71 changes the heat input during drawing the scribed pattern S according to the scribed circle data D by multiplying the recommended heat input identified in the recommended pattern identifying process of S3 or the maximum heat input calibrated depending on the thickness of the test piece W by the scale factor identified by the material of the test piece W in the material calibration table (see FIG. 11). The heat input during drawing the scribed pattern S according to the scribed circle data D is calibrated in accordance with the material of the test piece W, thereby reducing the effect on the deformation of the test piece W in the scribed circle test.

After applying the editing contents inputted on the pattern editing window 90 to the current scribed pattern S according to the selected one recommended pattern, the CPU 71 ends the editing contents applying process of S7, and advances to S8.

In S8 the CPU 71 determines whether a data generation manipulation instruction generation of the scribed circle data D is performed according to an input signal from the input manipulation unit 76. More specifically, the CPU 71 determines whether an input manipulation of the generate button 98 on the pattern editing window 90 is performed. If the data generation manipulation is performed (S8: YES), the CPU 71 advances to S9. On the other hand, if the data generation manipulation is not performed (S8: NO), the CPU 71 returns to S6 and accepts the editing manipulation on the pattern editing window 90.

In S9 the CPU 71 generates the scribed circle data D representing the scribed pattern S at the time when the data generation manipulation is performed. This scribed circle data D is generated on the basis of the scribed pattern S specified in accordance with various machining contents inputted on the machining contents input window 80, and is edited through the recommended pattern display window 85 and the pattern editing window 90 in a desired manner for the user. Thus, the data generating device 7 can easily generate the scribed circle data D that corresponds to the configuration of the test piece W and the machining contents in the scribed circle test and is desired by the user. After storing the generated scribed circle data D in the RAM 72, the CPU 71 advances to S10.

In S10 the CPU 71 reads the scribed circle data D generated in S9 from the RAM 72 and outputs the scribed circle data D to the laser controller 5 constituting the laser machining device 1. The laser machining device 1 draws the scribed pattern S represented by the scribed circle data D on the surface of the test piece W by scanning the laser beam L according to the scribed circle data D.

Consequently, the test piece W can be created on which the scribed pattern S corresponding to the machining contents of the machining process to be performed in the scribed circle test and the configuration of the test piece W and desired by the user is drawn. Thus, by virtue of using this test piece W in the scribed circle test, the examination of the deformation of the test piece W and the measurement of the strain distribution in the test piece W can be performed at high accuracy.

As described above, according to the data generating device 7 of the present embodiment, a recommended pattern is identified according to the machining contents inputted on the machining contents input window 80 and the contents of the database 75D, and scribed circle data D is generated in accordance with the identified recommended pattern. Therefore, the scribed circle data D appropriate to the machining contents of the machining process in the scribed circle test can be generated, thereby enhancing the convenience of the generation of the scribed circle data D. Further, the appropriate scribed pattern S can be drawn on the surface of the test piece W by outputting the scribed circle data D from the data generating device 7 to the laser controller 5 of the laser machining device 1. Therefore, the examination of the deformation of the test piece W and the analysis of the strain distribution in the test piece W can be performed at high accuracy in the scribed circle test.

Further, the heat input of the laser beam L per unit area on the surface of the test piece W during drawing the scribed pattern S according to the scribed circle data D is set to the heat amount corresponding to the machining contents inputted on the machining contents input window 80. Therefore, the scribed circle data D appropriate to the machining contents to be applied to the test piece W can be generated, thereby enhancing the convenience of the generation of the scribed circle data D.

The scribed circle data D is generated by changing the size of each unit graphic U constituting the scribed pattern S represented by the scribed circle data D according to the machining contents inputted on the machining contents entry window 80. Therefore, the data generating device 7 can generate the scribed circle data D appropriate to the machining contents of the machining process to be performed on the test piece W, thereby enhancing the convenience of the generation of the scribed circle data D.

When the machining type of the machining process to be applied to the test piece W such as "drawing," "compressing," and "stretching" is inputted as the machining contents by use of the machining type designating part 81 of the machining contents input window 80, the size of each unit graphic U in the scribed pattern S represented by the scribed circle data D can be changed into the size corresponding to the machining type (see S3 of FIG. 4 and FIG. 7). A user can accurately recognize the scribed pattern S drawn on the surface of the test piece W even after the deformation of the test piece W is caused by the machining in accordance with the machining type, thereby enhancing the measurement accuracy of the deformation of the test piece W and the convenience of the measurement in the scribed circle test.

When the number of processes until completion of the scribed circle test is inputted as the machining contents by use of the number of processes designating part 82 of the machining contents input window 80, the data generating device 7 sets the heat input of the laser beam L during drawing the scribed pattern S according to the scribed circle data D to the heat input corresponding to the number of processes and generates the scribed circle data D (see FIG. 7). Thus, the data generating device 7 can balance the drawing form (machining depth, line width, intensity, and the like) of the laser beam L with time required to draw the scribed pattern S, thereby optimizing time duration required to measure the deformation of the test piece W.

When the deformation degree of the test piece W in the scribed circle test is inputted by use of the deformation degree designating part 83 of the machining contents input window 80, the data generating device 7 sets the size of each unit graphic U in the scribed pattern S represented by the scribed circle data D to the size corresponding to the deformation degree (see S3 of FIG. 4 and FIG. 7). In the scribed circle test, the clarity of each unit graphic U in the scribed pattern S drawn on the surface of the test piece W is changed depending on the contents and degree of the deformation of the test piece W. The data generating device 7 can draw, on the surface of the test piece W, the scribed pattern S constituted with unit graphics U having a size corresponding to the deformation degree of the test piece W according to the scribed circle data D, thereby easily performing the examination of the deformation and the measurement of the strain at a deformed part of the test piece W and enhancing the convenience in the scribed circle test.

Further, in S3 of FIG. 4, the data generating device 7 identifies the recommended patterns recommended for the machining contents according to the machining contents inputted by use of the machining contents input window 80 and the contents of the database 75D, and displays the recommended patterns on the recommended pattern display part 86 of the recommended pattern display window 85 (see FIG. 8). Subsequently, when one of the recommended patterns is selected in the recommended pattern display part 86 by use of the selection cursor C, the data generating device 7 can generate the scribed circle data D using the selected recommended pattern. That is, the data generating device 7 can generate the scribed circle data D representing the scribed pattern S adequate for the contents of the scribed circle test and desired by the user.

Further, the data generating device 7 can edit the contents of the scribed circle data D by use of the pattern editing window 90. Thus, the scribed circle data D appropriate to the contents of the scribed circle test can be edited in a form desired by the user, thereby enhancing the convenience of generating the scribed circle data D and the convenience in the scribed circle test.

Further, the data generating device 7 can perform the intersection removal by setting whether to remove each intersection P (see FIG. 5) in the scribed pattern S according to the scribed circle data D by use of the intersection removal setting part 91 of the pattern editing window 90. Although the drawing of each intersection P in the scribed pattern S of the scribed circle data D may affect the deformation of the test piece W in the scribed circle test, the data generating device 7 can perform the editing related to the intersection removal, thereby reducing the effect on the scribed circle test.

The data generating device 7 calibrates the heat input of the laser beam L per unit area on the surface of the test piece W by inputting the thickness of the test piece W by use of the thickness setting part 92 of the pattern editing window 90 (see FIG. 10). Thus, according to the data generating device 7, the editing to calibrate the heat input corresponding to the thickness of the test piece W is performed, thereby reducing the effect on the deformation of the test piece W in the scribed circle test.

The data generating device 7 calibrates the heat input of the laser beam L per unit area on the surface of the test piece W by inputting the material of the test piece W by use of the material setting part 93 of the pattern editing window 90 (see FIG. 11). Thus, according to the data generating device 7, the editing to calibrate the heat input corresponding to the material of the test piece W is performed, thereby reducing the effect on the deformation of the test piece W in the scribed circle test.

When the editing is performed by use of the reference position designating part 94 of the pattern editing window 90, the data generating device 7 performs the editing to add a reference index R at a designated position in the scribed pattern S represented by the scribed circle data D (see FIG. 5). Since the reference index R indicates a relative positional relationship of the unit graphics included in the scribed pattern S represented by the scribed circle data D, the relative positional relationship of each unit graphic U in the scribed pattern S can be identified by regarding the reference index R as a reference. Therefore, the examination of the deformation of the test piece W and the analysis of the strain distribution in the test piece W can be easily performed at high accuracy.

When the editing is performed by use of the scale setting part 95 of the pattern editing window 90, the data generating device 7 adds the scale as a reference index to the scribed pattern S represented by the scribed circle data D (see FIG. 8). Thus, according to the data generating device 7, when the scribed circle test is performed, the relative positional relationship in the scribed pattern S can be identified on the basis of the scale. Therefore, the examination of the deformation of the test piece W and the analysis of the strain distribution in the test piece W can be easily performed at high accuracy.

When the editing is performed by use of the line style setting part 96 of the pattern editing window 90, the data generating device 7 draws the reference index R having different line style on the scribed pattern S according to the scribed circle data D. Consequently, the data generating device 7 can provide the test piece W on which the scribed pattern S is drawn so that the relative positional relationship in the scribed pattern S can be accurately identified.

While the description has been made in detail with reference to specific embodiment, it would be apparent to those skilled in the art that various changes and modifications may be made thereto. For example, in the embodiment described above, the selection cursor C is used by the user for the selection on the recommended pattern display part 86 of the recommended pattern presentation window 85. However, the present disclosure is not limited to this example. For example, provided that the most adequate recommended pattern can be identified according to the machining contents inputted on the machining contents input window 80 and the contents of the data base 75D, the CPU 71 may determine one recommended pattern.

In the embodiment described above, for the purpose of illustration, the whole surface of the test piece W is handled as one region and the scribed circle data D is generated so as to draw one scribed pattern S on the one region. However, the present disclosure is not limited to this example. For example, a plurality of regions may be defined on the surface of the test piece W, and different scribed patterns S may be set in each of the plurality of regions. In this case, the scribed circle data D is configured of a plurality of scribed patterns S.

In the embodiment described above, the data generating device 7 outputs the generated scribed circle data D to the laser controller 5 of the laser machining device 1, but the present disclosure is not limited to this example. The scribed circle data D is not limited to be outputted directly to the laser controller 5, but may be outputted to, for example, a memory card as a recording medium, or may be uploaded on a server connected to a network. In this case, the scribed circle data D is needed to be loaded into the laser controller 5 of the laser machining device 1.

Further, in the embodiment described above, editable items by use of the pattern editing window 90 include the intersection removal setting part 91, the thickness setting part 92, the material setting part 93, the reference position setting part 94, the scale setting part 95, and the line style setting part 96. However, the present disclosure is not limited to this example. For example, a size of a pattern drawing region in which the scribed pattern S of the scribed circle data D is drawn on the surface of the test piece W may be edited. When the size of the pattern drawing region is edited, the scribed pattern S for the pattern drawing region is determined by specifying the size of each unit graphic U constituting the scribed pattern S according to the size of the pattern drawing region and arranging the specified unit graphics U.

What is claimed is:

1. A data generating device for generating drawing data representing an index pattern to be drawn on a surface of a workpiece by a laser beam emitted from a laser machining device, the index pattern being constituted with a plurality of unit graphics, a deformation test being performed to measure deformation of the workpiece, the data generating device comprising:
   a memory configured to store a plurality of sets of drawing information about the index pattern and the laser beam used for drawing the index pattern in association with respective ones of a plurality of sets of machining contents individually, each of the plurality of machining contents indicating a machining process to be performed on the workpiece in the deformation test; and
   a controller configured to perform:
      receiving a generation instruction instructing to start generating the drawing data;
      designating one set of machining contents from the plurality of sets of machining contents; and
      generating the drawing data according to designated one set of machining contents and corresponding one of the plurality of sets of drawing information.

2. The data generating device according to claim 1, wherein each of the plurality of sets of drawing information includes information about a heat amount to be applied per unit area of the surface of the workpiece by the laser beam.

3. The data generating device according to claim 1, wherein each of the plurality of sets of drawing information includes information about a type of the plurality of unit graphics.

4. The data generating device according to claim 1, wherein each of the plurality of sets of machining contents includes a machining type of the machining process.

5. The data generating device according to claim 1, wherein each of the plurality of sets of machining contents includes information about number of processes for completing the machining process in the deformation test.

6. The data generating device according to claim 1, wherein each of the plurality of sets of machining contents includes information about a deformation degree of the workpiece during the machining process in the deformation test.

7. The data generating device according to claim 1, wherein each of the plurality of sets of drawing information includes information about at least one recommended index pattern,
   wherein the controller is configured to further perform:
      outputting the at least one recommended index pattern corresponding to the designated one set of machining contents; and
      selecting one recommended index pattern from the at least one recommended index pattern as the index pattern,
   wherein the generating generates the drawing data according to the selected recommended index pattern.

8. The data generating device according to claim 1, wherein the controller is configured to further perform:
   receiving an editing instruction instructing to edit the drawing data; and
   editing the drawing data in response to receiving the editing instruction.

9. The data generating device according to claim 8, wherein the receiving receives the editing instruction instructing to remove an intersection in the index pattern, and
   wherein the editing removes the intersection from the index pattern represented by the drawing data in response to receiving the editing instruction.

10. The data generating device according to claim 8, wherein the receiving receives the editing instruction regarding a thickness of the workpiece, and
    wherein the editing changes a heat amount to be applied per unit area of the surface of the workpiece by the laser beam according to the thickness of the workpiece.

11. The data generating device according to claim 8, wherein the receiving receives the editing instruction regarding material of the workpiece, and
    wherein the editing changes a heat amount to be applied per unit area of the surface of the workpiece by the laser beam according to the material of the workpiece.

12. The data generating device according to claim 8, wherein the receiving receives the editing instruction instructing to draw a reference index indicating a relative positional relationship of the plurality of unit graphics in the index pattern with respect to the reference index, and
    wherein the editing adds the reference index to the index pattern represented by the workpiece in response to receiving the editing instruction.

13. The data generating device according to claim 12, wherein the reference index is a scale indicating the relative positional relationship of the plurality of unit graphics in the index pattern with respect to the reference index.

14. The data generating device according to claim 12, wherein the reference index is drawn with a line different from that of the plurality of unit graphics.

* * * * *